(12) United States Patent
Zhang

(10) Patent No.: US 8,333,484 B2
(45) Date of Patent: Dec. 18, 2012

(54) LIGHT SOURCE DEVICE AND PORTABLE ELECTRONIC DEVICE USING SAME

(75) Inventor: Tao Zhang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 380 days.

(21) Appl. No.: 12/831,355

(22) Filed: Jul. 7, 2010

(65) Prior Publication Data

US 2011/0116268 A1 May 19, 2011

(30) Foreign Application Priority Data

Nov. 18, 2009 (CN) .......................... 2009 1 0309953

(51) Int. Cl.
*G09F 13/08* (2006.01)
*G02F 1/13357* (2006.01)

(52) U.S. Cl. ....... 362/97.3; 362/259; 362/615; 362/608; 362/632; 362/97.1

(58) Field of Classification Search ................... 362/259, 362/296.01, 606–629, 559, 632, 561, 97.1–97.4
See application file for complete search history.

(56) References Cited

U.S. PATENT DOCUMENTS

| | | | | |
|---|---|---|---|---|
| 5,550,715 A | * | 8/1996 | Hawkins | ........................ 362/630 |
| 5,608,837 A | * | 3/1997 | Tai et al. | ........................ 362/559 |
| 6,250,767 B1 | * | 6/2001 | Kusafuka et al. | ............. 362/611 |

FOREIGN PATENT DOCUMENTS

| | | | | |
|---|---|---|---|---|
| JP | 63091629 A | * | 4/1988 | |
| JP | 09265069 A | * | 10/1997 | |
| JP | 11305230 A | * | 11/1999 | |

* cited by examiner

*Primary Examiner* — Mariceli Santiago
(74) *Attorney, Agent, or Firm* — Altis Law Group, Inc.

(57) ABSTRACT

A portable electronic device includes a housing, a display module received in the housing, and a light source device received in the housing. The light source device includes a light guiding unit, a light reflecting unit, and stimulated radiation medium positioned between the light guiding unit and the light reflecting unit. Outside light arrives at the medium through the light guiding unit and stimulates the medium to emit light, and the light emitted by the medium is reflected by the light reflecting unit to emit from the light guiding unit and illuminate the display module.

15 Claims, 3 Drawing Sheets

LIGHT SOURCE DEVICE AND PORTABLE ELECTRONIC DEVICE USING SAME

BACKGROUND

1. Technical Field

The present disclosure relates to light source devices of portable electronic devices, and particularly to a light source device that does not consume battery electric power and a portable electronic device using the same.

2. Description of Related Art

Portable electronic devices, such as mobile phones, personal digital assistants (PDA), and digital cameras, are widely used. Built-in light source devices, such as backlight modules, are generally used in these portable electronic devices for illumination. However, conventional light source devices use electric power provided by power supplies (e.g., batteries) of the portable electronic devices, requiring more frequent charging of the power supplies.

Therefore, there is room for improvement within the art.

BRIEF DESCRIPTION OF THE DRAWINGS

Many aspects of the present light source device and portable electronic device using the same can be better understood with reference to the following drawings. The components in the various drawings are not necessarily drawn to scale, the emphasis instead being placed upon clearly illustrating the principles of the present light source device and portable electronic device using the same. Moreover, in the drawings, like reference numerals designate corresponding parts throughout the figures.

DETAILED DESCRIPTION

Figure 1:
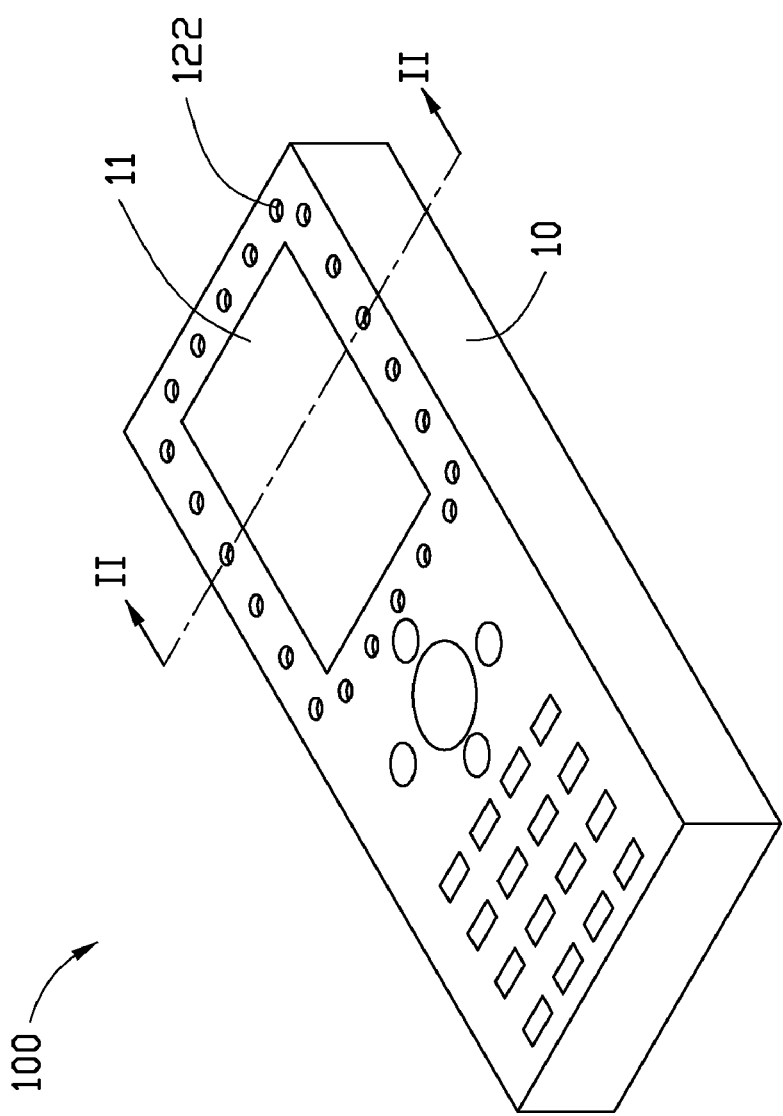
FIG. 1 is a schematic view of a portable electronic device, according to an exemplary embodiment.
Figure 2:
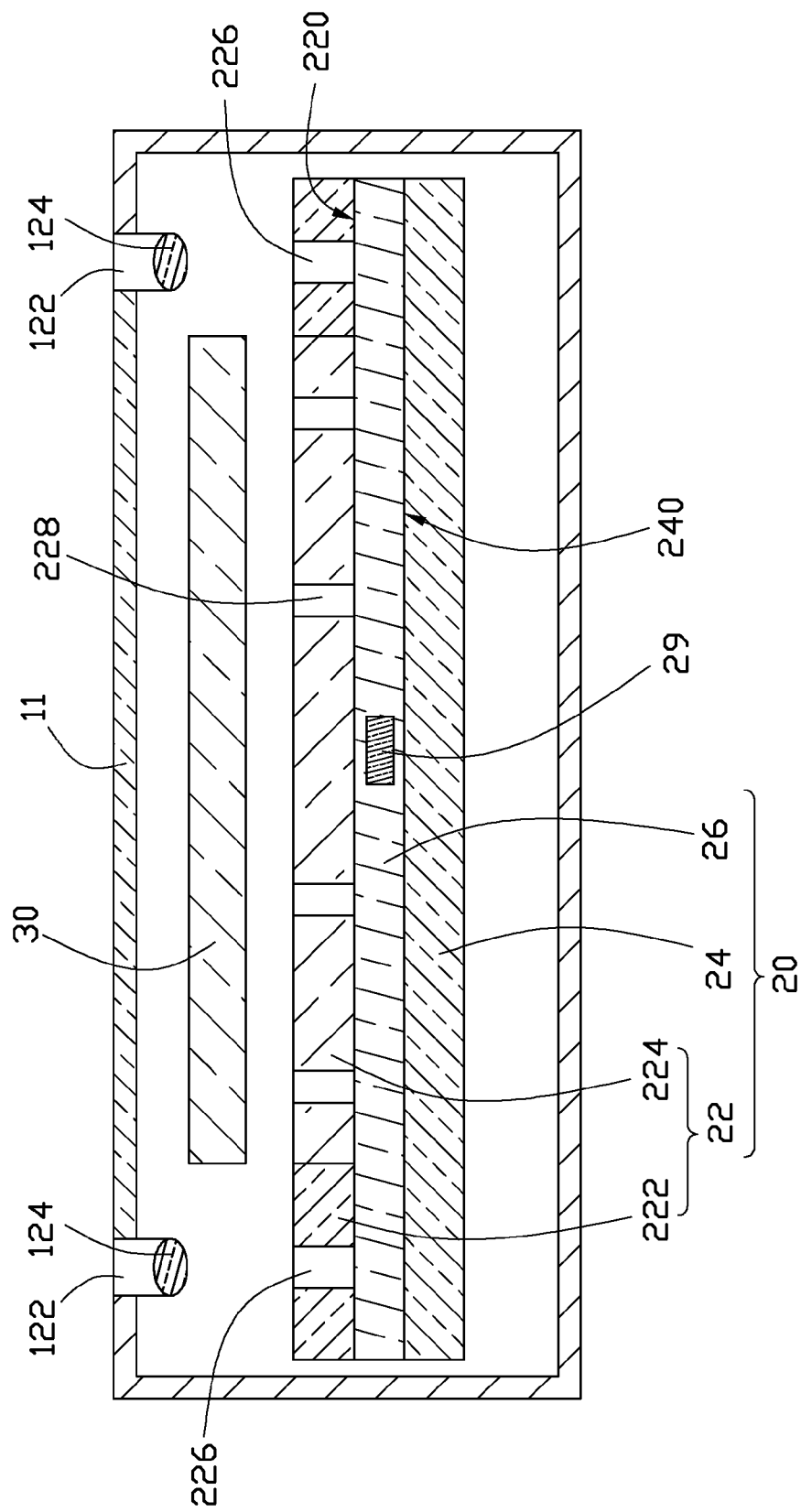
FIG. 2 is a cutaway view along the line II-II shown in FIG. 1.

FIG. 1 and FIG. 2 show a portable electronic device 100 according to an exemplary embodiment. In the present disclosure, the portable electronic device 100 is a mobile phone, but can also be a personal digital assistant (PDA), a game console, a digital camera, etc. The portable electronic device 100 includes a housing 10, a light source device 20, and a display module 30.

Referring to FIG. 1, the housing 10 can be a conventional case used in portable electronic devices. The housing 10 includes a transparent window 11 formed thereon, and defines a plurality of through light receiving holes 122 around the window 11. Also referring to FIG. 2, the housing 10 further includes a plurality of convex lenses 124 corresponding to the light receiving holes 122. Each convex lens 124 is fixed in a corresponding light receiving hole 122.

The light source device 20 includes a light guiding unit 22, a light reflecting unit 24, and stimulated radiation medium 26. The light guiding unit 22 and the light reflecting unit 24 are both planar boards and parallel to each other. The light guiding unit 22 includes a planar first reflective surface 220, and the light reflecting unit 24 includes a planar second reflective surface 240. The first reflective surface 220 and the second reflective surface 240 are positioned parallel to and facing each other. The medium 26 is sandwiched between the light guiding unit 22 and the light reflecting unit 24. The medium 26 may be made of transparent laser glass. Upon exposure to a light source of sufficient intensity, the medium 26 is stimulated to emit light.

The light guiding unit 22 includes a light incident member 222 formed on a peripheral portion thereof and a light emitting member 224 formed on a central portion thereof. The light incident member 222 defines a plurality of through light incident holes 226 corresponding to the light receiving holes 122. The light emitting member 224 defines a plurality of through light emitting holes 228.

The display module 30 can be a conventional display used in portable electronic devices. In assembly, the light source device 20 and the display module 30 are both received in the housing 10 and aligned with the window 11. The light incident holes 226 are aligned with their corresponding light receiving holes 122. The light emitting member 224 is aligned with the window 11, and the display module 30 is positioned between the light emitting member 224 and the window 11.

Figure 3:
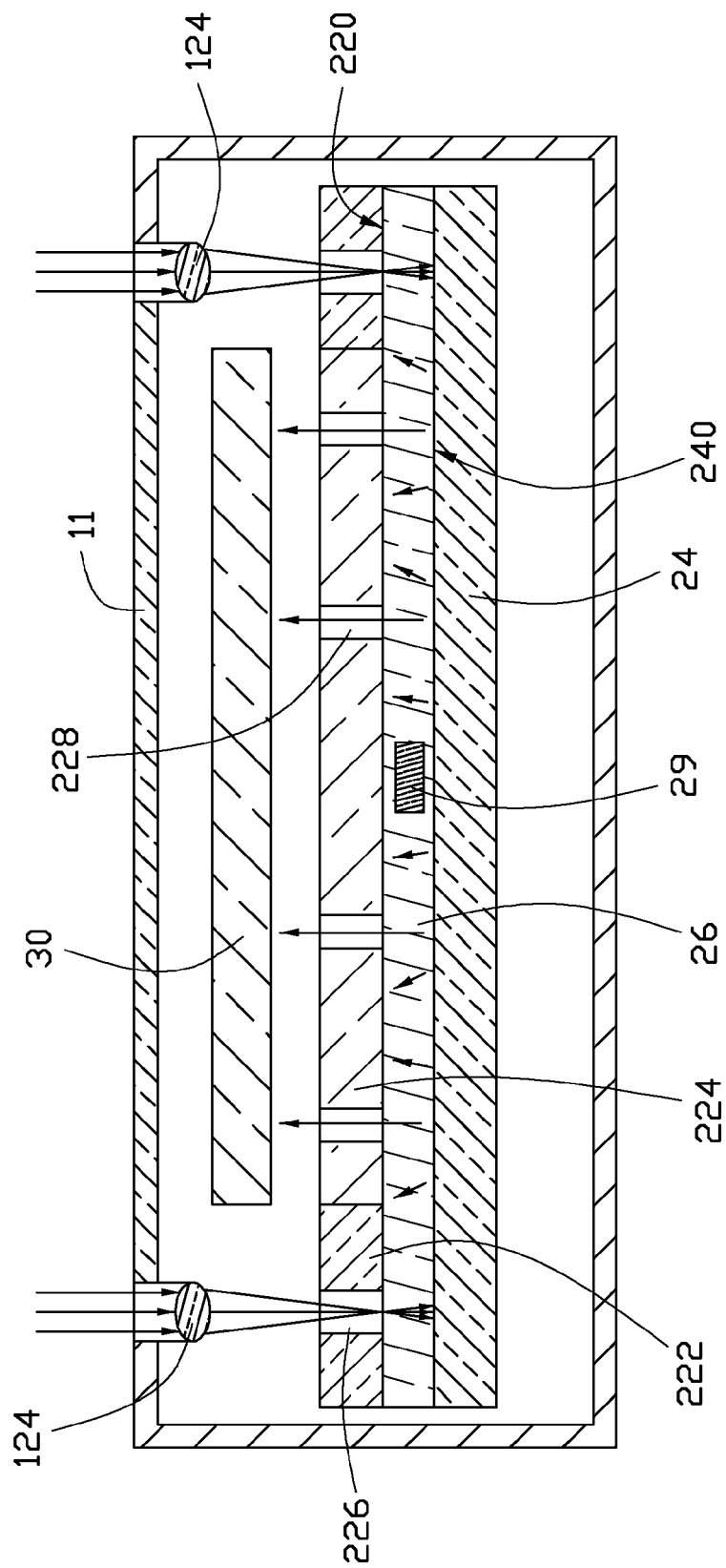
FIG. 3 is a schematic view of generating backlight by the portable electronic device shown in FIG. 1.

Also referring to FIG. 3, when the portable electronic device 100 is used, the display module 30 is connected to conventional circuitry (not shown) of the portable electronic device 100 to receive image data and display corresponding images, and the displayed imaged can be seen from the window 11. Ambient outside light, such as sunlight or lamplight, can enter the light receiving holes 122 and the convex lenses 124 fixed in the light receiving holes 122. The outside light arriving at the convex lenses 124 is converged by the convex lenses 124, such that the intensity of the outside light is increased to be capable of stimulating the medium 26 to emit light. The converged light then enters the light source device 20 through the light incident holes 226 aligned with the light receiving holes 122, and arrives at the medium 26.

When the medium 26 is irradiated by the converged outside light, it is stimulated to emit light. Most of the light emitted by the medium 26 is reflected by the first reflective surface 220 and the second reflective surface 240 many times. Light that is reflected by the second light reflective surface 240 to transmit towards the light emitting holes 228 passes through the light emitting holes 228 and is emitted from the light emitting member 224. The light emitting from the light emitting member 224 can serve as a backlight to illuminate the display module 30, without consuming electric power. In this way, electric power of the power supply (not shown) of the portable electronic device 100 can be conserved.

In above disclosure, the convex lenses 124 can also be correspondingly fixed in the light incident holes 226 to converge outside light entering the light incident holes 226 through the light receiving holes 122, such that the intensity of the outside light arriving at the medium 26 through the light incident holes 226 are increased to be capable of stimulating the medium 26 to emit light.

Additionally, the light source device 20 can further include a backlight lamp 29, such as a light emitting diode (LED). The backlight lamp 29 can be installed between the light guiding unit 22 and the light reflecting unit 24, i.e., installed inside the medium 26. When ambient outside light around the portable electronic device 100 is low, the backlight lamp 29 is actuated. Light emitted by the backlight lamp 29 is also reflected by the first reflective surface 220 and the second reflective surface 240 many times, thus light that is reflected towards the light emitting holes 228 passes through the light emitting holes 228 and is emitted from the light emitting member 224 to enhance the illumination of the display module 30. Furthermore, the light emitted by the backlight lamp 29 can also stimulate the medium 26 to emit light, and the light emitted by the medium 26 that is reflected towards the light emitting holes 228 can also illuminate the display module 30.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A portable electronic device, comprising:
   a housing;
   a display module received in the housing; and
   a light source device received in the housing, the light source device comprising:
      a light guiding unit configured for guiding outside light into the light source device;
      a light reflecting unit configured for reflecting light to the light guiding unit; and
      stimulated radiation medium positioned between the light guiding unit and the light reflecting unit, the medium configured for being stimulated by outside light entering the light source device to emit light;
   wherein the light emitted by the medium is reflected by the light reflecting unit to emit from the light guiding unit and illuminate the display module.

2. The portable electronic device as claimed in claim 1, wherein the light guiding unit defines a plurality of light incident holes for enabling the outside light to pass through to arrive at the medium, and a plurality of light emitting holes for enabling the light emitted by the medium to emit from the light emitting holes to illuminate the display module.

3. The portable electronic device as claimed in claim 2, wherein the housing includes a transparent window and defines a plurality of light receiving holes around the window, the display module aligned with the window, the light receiving holes corresponding to the light incident holes and aligned with the light incident holes.

4. The portable electronic device as claimed in claim 3, wherein the housing further includes a plurality of convex lenses corresponding to the light receiving holes, each convex lens fixed in a corresponding light receiving hole, such that the outside light entering the light receiving holes is converged by the convex lens and then arrive at the medium by the light incident holes.

5. The portable electronic device as claimed in claim 4, wherein the light guiding unit includes a light incident member formed on a peripheral portion thereof and a light emitting member formed on a central portion thereof, the light incident holes defined in the light incident member, the light emitting holes defined in the light emitting member, the light emitting member aligned with the display module, and the display module positioned between the window and the light emitting member.

6. The portable electronic device as claimed in claim 1, wherein the light source device further includes a backlight lamp installed inside the medium, light emitted by the backlight lamp illuminating the display module and stimulating the medium to emit light, and the light emitted by the medium also emitting from the light guiding unit to illuminate the display module.

7. The portable electronic device as claimed in claim 1, wherein the light guiding unit includes a first reflective surface and the light reflecting unit includes a second reflective surface, the first reflective surface and the second reflective surface facing each other.

8. The portable electronic device as claimed in claim 1, wherein the medium is made of laser glass.

9. A light source device used in a portable electronic device having a display module, comprising:
   a light guiding unit configured for guiding outside light into the light source device;
   a light reflecting unit configured for reflecting light to the light guiding unit; and
   stimulated radiation medium positioned between the light guiding unit and the light reflecting unit, the medium configured for being stimulated by the light entering the light source device to emit light;
   wherein the light emitted by the medium is reflected by the light reflecting unit to emit from the light guiding unit and illuminate the display module.

10. The light source device as claimed in claim 9, wherein the light guiding unit defines a plurality of light incident holes for enabling the outside light to pass through to arrive at the medium, and a plurality of light emitting holes for enabling the light emitted by the medium to emit from the light emitting holes to illuminate the display module.

11. The light source device as claimed in claim 10, wherein the light guiding unit includes a light incident member formed on a peripheral portion thereof and a light emitting member formed on a central portion thereof, the light incident holes defined in the light incident member, the light emitting holes defined in the light emitting member.

12. The light source device as claimed in claim 11, further comprising a backlight lamp installed inside the medium, light emitted by the backlight lamp illuminating the display module and stimulating the medium to emit light, and the light emitted by the medium also emitting from the light guiding unit to illuminate the display module.

13. The light source device as claimed in claim 9, wherein the light guiding unit includes a first reflective surface and the light reflecting unit includes a second reflective surface, the first reflective surface and the second reflective surface facing each other.

14. The light source device as claimed in claim 9, wherein the medium is made of laser glass.

15. The light source device as claimed in claim 9, further comprising a plurality of convex lenses correspondingly fixed in the light incident holes to converge outside light entering the light incident holes, such that intensity of the outside light arriving at the medium by the light incident holes are increased to stimulate the medium to emit light.

* * * * *